US011261909B2

(12) United States Patent
Wei et al.

(10) Patent No.: US 11,261,909 B2
(45) Date of Patent: Mar. 1, 2022

(54) SWING BEARING AND WEARABLE DEVICE

(71) Applicant: BYD COMPANY LIMITED, Guangdong (CN)

(72) Inventors: Rongjie Wei, Shenzhen (CN); Yun Jiang, Shenzhen (CN); Haijian Tang, Shenzhen (CN); Conghua Jiang, Shenzhen (CN); Jianfeng Yang, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 0 days.

(21) Appl. No.: 16/979,815

(22) PCT Filed: Dec. 29, 2018

(86) PCT No.: PCT/CN2018/125342
§ 371 (c)(1),
(2) Date: Sep. 10, 2020

(87) PCT Pub. No.: WO2019/184514
PCT Pub. Date: Oct. 3, 2019

(65) Prior Publication Data
US 2021/0108679 A1    Apr. 15, 2021

(30) Foreign Application Priority Data
Mar. 30, 2018   (CN) .......................... 201810291163.8

(51) Int. Cl.
*F16C 19/16*    (2006.01)
*F16C 33/38*    (2006.01)
(Continued)

(52) U.S. Cl.
CPC ............ *F16C 19/163* (2013.01); *F16C 33/38* (2013.01); *F16C 33/58* (2013.01); *F16C 11/06* (2013.01);
(Continued)

(58) Field of Classification Search
CPC ...... F16C 19/06; F16C 19/163; F16C 23/086; F16C 33/38; F16C 33/58; F16C 33/585;
(Continued)

(56) References Cited

U.S. PATENT DOCUMENTS 2,653,456 A * 9/1953 Heym ..................... F16D 3/221
464/141
3,982,840 A * 9/1976 Grosseau .............. F16D 3/2245
403/14
(Continued)

FOREIGN PATENT DOCUMENTS

CN    201141399 Y    10/2008
CN    201258917 Y    6/2009
(Continued)

OTHER PUBLICATIONS

English Translation of International Search Report from PCT/CN2018/125342 dated Mar. 20, 2019 (3 pages).

*Primary Examiner* — Marcus Charles
(74) *Attorney, Agent, or Firm* — Calfee, Halter & Griswold

(57) ABSTRACT

The present disclosure relates to a swing bearing and a wearable device. The swing bearing includes an inner ring, an outer ring, and a plurality of rolling elements, a plurality of first grooves arranged at intervals along a circumferential direction being formed on an outer circumferential surface of the inner ring, a plurality of second grooves arranged at intervals along a circumferential direction being formed on an inner circumferential surface of the outer ring, each rolling element being disposed between the corresponding first groove and the second groove, and the rolling element, the first groove, and the second groove being configured to restrict relative rotational movement between the inner ring
(Continued)

and the outer ring and allow the inner ring and the outer ring to produce shaft axis deflection movement.

14 Claims, 14 Drawing Sheets

(51) Int. Cl.
*F16C 33/58* (2006.01)
*H02J 50/00* (2016.01)
*H02J 7/14* (2006.01)
*F16D 3/223* (2011.01)
*F16C 11/06* (2006.01)

(52) U.S. Cl.
CPC .......... *F16C 2361/61* (2013.01); *F16D 3/223* (2013.01); *H02J 7/14* (2013.01); *H02J 50/001* (2020.01)

(58) Field of Classification Search
CPC ......... F16C 11/06; G04C 21/04; G04C 10/00; G04C 3/008; B25B 23/008; B25B 23/0085; F16D 3/22; F16D 3/221; F16D 3/224; F16D 3/226; F16D 3/2237; F16D 3/223; Y10S 464/906
USPC ................. 384/523; 403/14, 56–57, 76, 114; 464/141, 145, 175, 906
See application file for complete search history.

(56) References Cited

U.S. PATENT DOCUMENTS

| | | | | |
|---|---|---|---|---|
| 4,358,283 A * | 11/1982 | Kumpar | ................. | F16D 3/224 464/143 |
| 4,549,872 A * | 10/1985 | Kumpar | ................. | F16D 3/221 464/141 |
| 5,201,107 A * | 4/1993 | Mazziotti | .............. | F16D 3/2245 29/434 |
| 5,632,683 A * | 5/1997 | Fukumura | ............... | F16D 3/227 464/144 |
| 5,823,883 A * | 10/1998 | Hopson | ................... | F16D 3/223 464/145 |
| 6,793,473 B1 * | 9/2004 | Fridley | .................. | B29B 9/065 425/196 |
| 8,246,476 B2 * | 8/2012 | Chen | .................... | B25B 13/481 464/141 |

FOREIGN PATENT DOCUMENTS

| | | | | |
|---|---|---|---|---|
| CN | 202790097 U | 3/2013 | | |
| CN | 203911505 U | 10/2014 | | |
| CN | 104454968 A | 3/2015 | | |
| EP | 1519064 A1 * | 3/2005 | ........... | F16D 3/2237 |
| FR | 2977536 A3 * | 1/2013 | ............. | B63H 23/34 |
| JP | H11236925 A * | 8/1999 | | |
| JP | 2001099961 A | 4/2001 | | |

* cited by examiner

SWING BEARING AND WEARABLE DEVICE

CROSS-REFERENCE TO RELATED APPLICATIONS

The present application is the National Stage of International Application No. PCT/CN2018/125342, filed on Dec. 29, 2018, which claims priority to Chinese Patent Application No. 201810291163.8 filed on Mar. 30, 2018, which are incorporated herein by reference in their entireties.

FIELD

The present disclosure relates to the technical field of energy conversion for wearable devices, and in particular, to a swing bearing and a wearable device.

BACKGROUND

With the rapid development of the Internet of Things technology, people's attention and demand for wearable devices are increasing. However, charging and endurance of wearable devices have become one of major problems that restrict the development of wearable devices. How to use mechanical energy and daily exercise energy as auxiliary energy or even independent energy for the wearable devices is the key to resolving the problems of frequent charging and short endurance of batteries of the wearable devices. However, energy conversion efficiency of a power generation module for converting mechanical energy in the existing wearable devices is low, an effect is not obvious, and endurance problem of the wearable devices cannot be completely resolved.

SUMMARY

An objective of the present disclosure is to provide a swing bearing and a wearable device, and the swing bearing can improve energy conversion efficiency of a power generation module of the wearable device.

In order to achieve the above objective, the present disclosure provides a swing bearing, including an inner ring, an outer ring, and a plurality of rolling elements, a plurality of first grooves arranged at intervals along a circumferential direction being formed on an outer circumferential surface of the inner ring, a plurality of second grooves arranged at intervals along a circumferential direction being formed on an inner circumferential surface of the outer ring, each rolling element being disposed between the corresponding first groove and the second groove, and the rolling element, the first groove, and the second groove being configured to restrict relative rotational movement between the inner ring and the outer ring and allow the inner ring and the outer ring to produce shaft axis deflection movement.

Another aspect of the present disclosure provides a wearable device, a housing, and a power generation module and a circuit board disposed in the housing for generating electric energy, where the circuit board is provided with an energy collection module configured to collect electric energy, a detection function module configured to detect movement information, and a radio frequency module configured to exchange data with a terminal device, the power generation module providing electric energy for the detection function module and the radio frequency module through the energy collection module, the energy collection module being connected to the power generation module, and the detection function module being connected to the radio frequency module; and the power generation module includes a substrate, a counter weight, a rotating shaft, a transmission mechanism, a permanent magnet, a soft magnet, a coil, and the above swing bearing, the rotating shaft being rotatably mounted on the substrate, the counter weight being mounted on the rotating shaft through the swing bearing, the inner ring of the swing bearing being fixed to the rotating shaft, the outer ring of the swing bearing being fixed to the counter weight, the rotating shaft being connected to the permanent magnet through the transmission mechanism and driving the permanent magnet to rotate, the permanent magnet being located in the soft magnet, the coil being adjacent to the soft magnet, an axial direction of the coil being perpendicular to a rotation axis of the permanent magnet, and the coil being connected to the energy collection module.

The swing bearing of the present disclosure is applied to the power generation module of the wearable device, so that the counter weight can swing within a specified angle range. When the counter weight is in an inclined state, that is, when there is a specified included angle between a plane on which the counter weight is located and a vertical plane, or when an inertial momentum is not on a rotation plane of the counter weight, the counter weight can not only rotate under the action of gravity or inertia, but also can automatically swing and adjust a position within a specified angle range through the swing bearing. In this way, a gravity component of a gravity of the counter weight in a vertical direction or a component of an inertial momentum on a rotation plane of the counter weight can be effectively increased, so that more mechanical energy or kinetic energy can be collected and converted to improve energy conversion efficiency of the power generation module.

Other features and advantages of the present disclosure will be described in detail in the following specific implementations.

BRIEF DESCRIPTION OF THE DRAWINGS

The accompanying drawings are provided to further understand the present disclosure, and they constitute a part of the specification. The accompanying drawings, along with the specific implementations, are used to explain the present disclosure, and pose no limitation on the present disclosure. In the figures.

DETAILED DESCRIPTION

Figure 1:
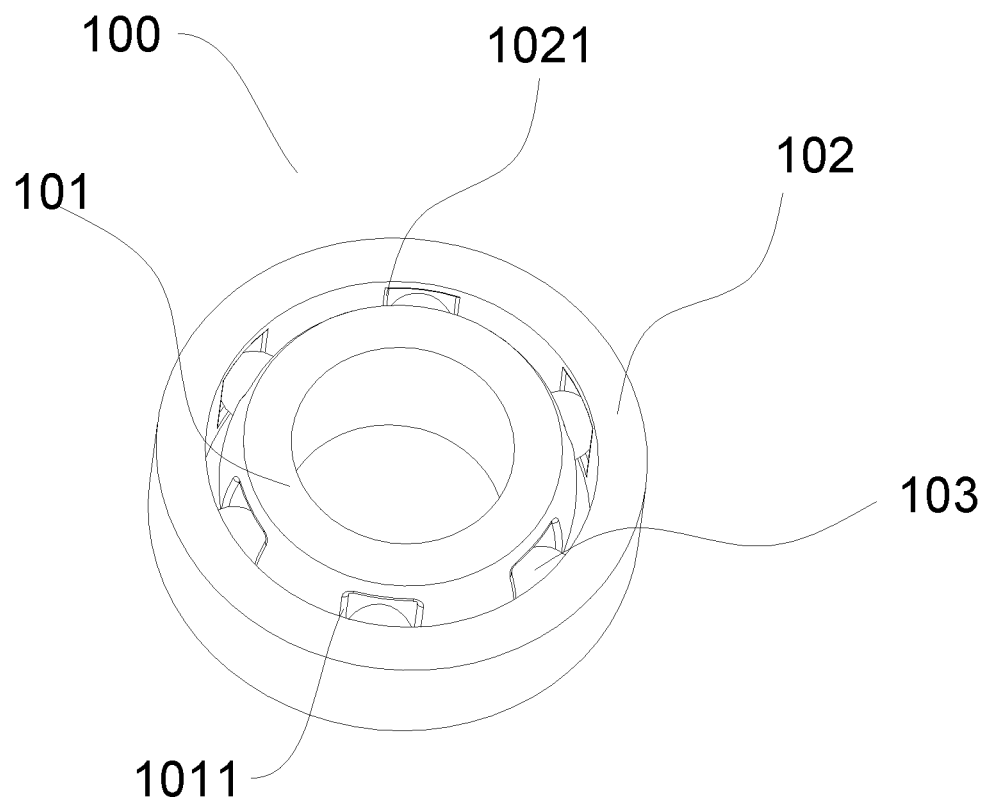
FIG. 1 is a schematic diagram of a three-dimensional structure of a swing bearing according to a third embodiment of the present disclosure.

The following describes the specific implementations of the present disclosure in detail with reference to the accompanying drawings. It should be understood that the specific implementations described herein are merely used to describe and explain the present disclosure, but are not intended to limit the present disclosure.

In the description of the present disclosure, it should be understood that orientation or position relationships indicated by the terms such as "above" and "below" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of the present disclosure. The "inside" and "outside" refer to the inside and outside of a corresponding outline.

At present, a power generation module of a wearable device usually adopts heavy pendulum energy collection to collect mechanical energy and movement energy. When a counter weight is in an inclined or vertical condition, the counter weight can use a gravity of the counter weight to rotate around a rotating shaft and overcome a starting torque of a permanent magnet rotor, or when a counter weight receives an inertial momentum of movement, the counter weight can also rotate around a rotating shaft to convert mechanical energy into electrical energy.

The applicant found through a large number of experiments that when a tester is running with a wearable device, power generation efficiency of a power generation module can reach an mW level, and when the tester raises a hand with the wearable device, power generation efficiency of the power generation module can reach only a µW level. Through an analysis of a heavy pendulum energy collection principle and experimental data, the applicant found that when the tester is running, a counter weight is located in a vertical plane, and the counter weight can rotate around a rotating shaft under the action of gravity, so that mechanical energy generated in a rotation process can be collected and converted into electrical energy with maximum efficiency. However, when the tester raises the hand, the counter weight is shifted back and forth between the vertical plane and a horizontal plane, shaking occurs, and only a small part of the mechanical energy is collected and converted into electrical energy. This is because when there is a specified included angle between a plane on which the counter weight is located and the vertical plane, a weight of the counter weight produces a component force in a vertical direction and an axial direction of the counter weight. Only a gravity component in the vertical direction can convert energy, and a gravity component in the axial direction of the counter weight not only cannot convert energy, but also generates a specified friction force in the axial direction of the counter weight, thereby increasing a starting torque for rotation of the counter weight. Likewise, during movement, when the inertial momentum received by the power generation module is located on a rotation plane of the counter weight, the inertial momentum can convert energy with maximum efficiency, and when there is a specified included angle between the inertial momentum and the rotation plane of the counter weight, only a component of the inertial momentum that is coplanar with the rotation plane of the counter weight can convert energy.

In actual application of the power generation module of the wearable device, the counter weight cannot always be in the vertical plane, and the inertial momentum cannot always be in the rotation plane of the counter weight. Therefore, a part of mechanical energy cannot be converted and collected, thereby reducing energy conversion efficiency. Although an inner ring and an outer ring of an existing self-aligning bearing can swing freely within a specified angle range, that is, produce shaft axis deflection movement, but the inner ring and the outer ring of the self-aligning bearing can also rotate relative to each other. If the counter weight is fixed on the rotating shaft through the existing self-aligning bearing, the weight counter can swing while rotating, but a rotating force cannot be transmitted to the rotating shaft through the self-aligning bearing to drive the rotating shaft to rotate. As a result, mechanical energy and movement energy cannot be converted into electric energy.

Based on the above findings, as shown in FIG. 1 to FIG. 6, the present disclosure provides a swing bearing 100, including an inner ring 101, an outer ring 102, and a plurality of rolling elements, a plurality of first grooves 1011 arranged at intervals along a circumferential direction being formed on an outer circumferential surface of the inner ring 101, a plurality of second grooves 1021 arranged at intervals along a circumferential direction being formed on an inner circumferential surface of the outer ring 102, each rolling element being disposed between the corresponding first groove 1011 and the second groove 1021, and the rolling element, the first groove 1011, and the second groove 1021 being configured to restrict relative rotational movement between the inner ring 101 and the outer ring 102 and allow the inner ring 101 and the outer ring 102 to produce shaft axis deflection movement. In other words, when the outer ring 102 rotates under force, the outer ring 102 may drive the inner ring 101 to rotate together through a ball 103. Similarly, when the inner ring 101 rotates under force, the inner ring 101 may also drive the outer ring 102 to rotate together through a ball 103. In addition, when the outer ring 102 and the inner ring 101 rotate synchronously, the outer ring 102 may swing relative to the inner ring 101 within a specified angle range, so that a rotation axis of the outer ring 102 and a rotation axis of the inner ring 101 form a specified included angle.

The swing bearing of the present disclosure is applied to the power generation module of the wearable device, so that the counter weight can swing within a specified angle range. When the counter weight is in an inclined state, that is, when there is a specified included angle between a plane on which the counter weight is located and a vertical plane, or when an inertial momentum is not on a rotation plane of the counter weight, the counter weight can not only rotate under the action of gravity or inertial momentum, but also can automatically swing and adjust a position within a specified angle range through the swing bearing. In this way, a gravity component of a gravity of the counter weight in a vertical direction or a component of an inertial momentum on a rotation plane of the counter weight can be effectively increased, so that more mechanical energy or kinetic energy can be collected and converted to improve energy conversion efficiency of the power generation module.

Further, the above rolling element may have any appropriate structure and shape. In an exemplary embodiment provided in the present disclosure, the above rolling element is a ball 103. Because a contact area of the ball 103 with the first groove 1011 and the second groove 1021 is small and a friction force is small, it is beneficial for the ball 103 to roll in the first groove 1011 and the second groove 1021. In other implementations, the above rolling element may also be a roller.

Figure 2:
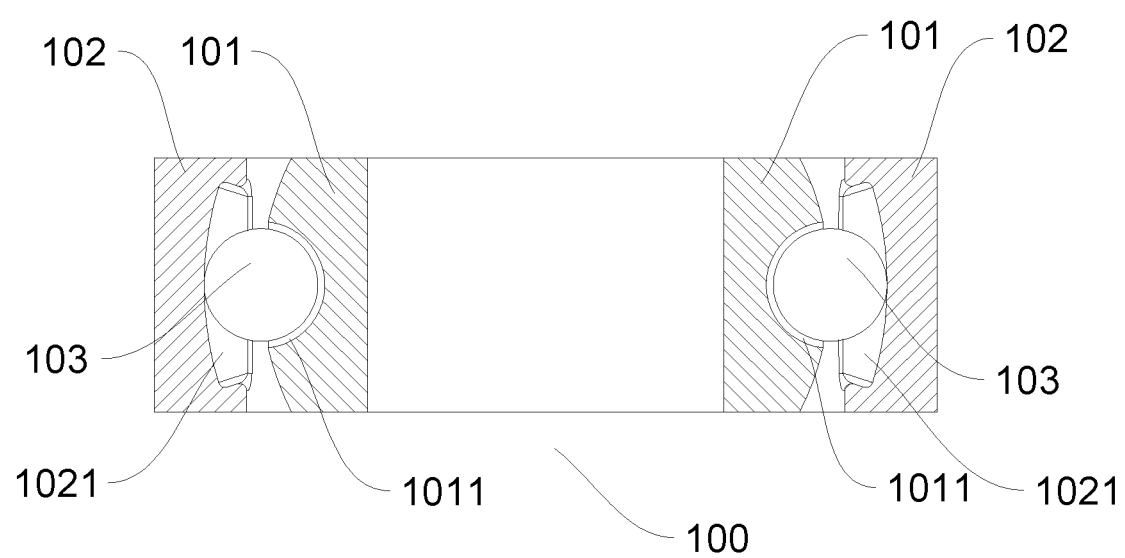
FIG. 2 is a cross-sectional view of a swing bearing according to a first embodiment of the present disclosure.
Figure 6:
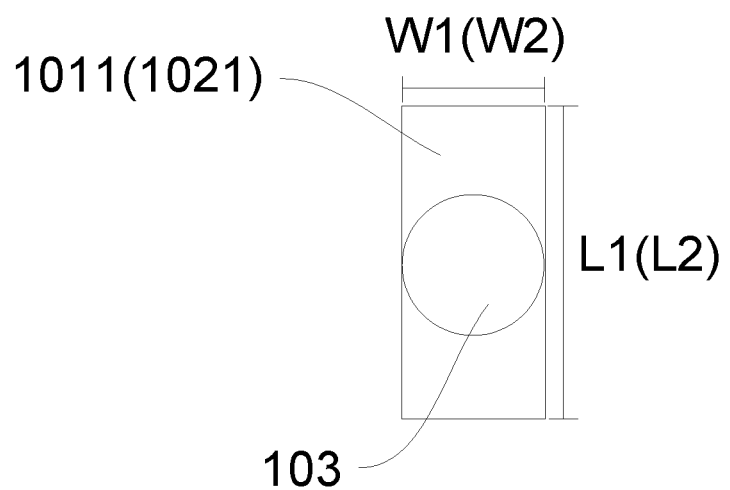
FIG. 6 is a front view of a first groove or a second groove according to an exemplary embodiment of the present disclosure, where a ball is located in the first groove or the second groove.

In a first implementation provided in the present disclosure, as shown in FIG. 2 and FIG. 6, the first groove 1011 is a spherical groove, a size L2 of the second groove 1021 in an axial direction of the outer ring 102 is greater than a size W2 of the second groove in a circumferential direction of the outer ring 102, one end of the ball 103 is adaptively accommodated in the first groove 1011, and the other end of the ball 103 is adaptively accommodated in the second groove 1021 and can roll along a length direction of the second groove 1021. In other words, a shape and a size of the first groove 1011 match a shape and a size of the ball 103, so that a surface of the first groove 1011 is pressed against a surface of one end of the ball 103, or there is a very narrow gap between a surface of the first groove 1011 and a surface of one end of the ball 103. Therefore, one end of the ball 103 is restricted in the first groove 1011, and the ball 103 cannot move relative to the inner ring 101 in circumferential and axial directions. The size of the second groove 1021 in the circumferential direction of the outer ring 102 is adapted to a size of the other end of the ball 103, to restrict circumferential movement of the ball 103 through two side walls of the second groove 1021. The size of the second groove 1021 in the axial direction of the outer ring 102 is greater than the size of the second groove in the circumferential direction of the outer ring 102, that is, greater than the size of the other end of the ball 103, so that the ball 103 can roll in the length direction of the second groove 1021. In this way, shapes of the first groove 1011 and the second groove 1021 can restrict the ball 103 from moving along a circumferential direction of the swing bearing 100 and can only roll along the length direction of the second groove 1021, so that the outer ring 102 can drive the inner ring 101 to rotate together through the ball 103, and the outer ring 102 can produce shaft axis deflection movement relative to the inner ring 101.

Further, a bottom surface of the second groove 1021 is a concave surface, that is, is recessed in a direction away from the inner ring 101, so that a rolling track of the ball 103 along the length direction of the second groove 1021 is arc-shaped, thereby ensuring that swinging of the outer ring 102 relative to the inner ring 101 is shaft axis deflection movement.

Figure 3:
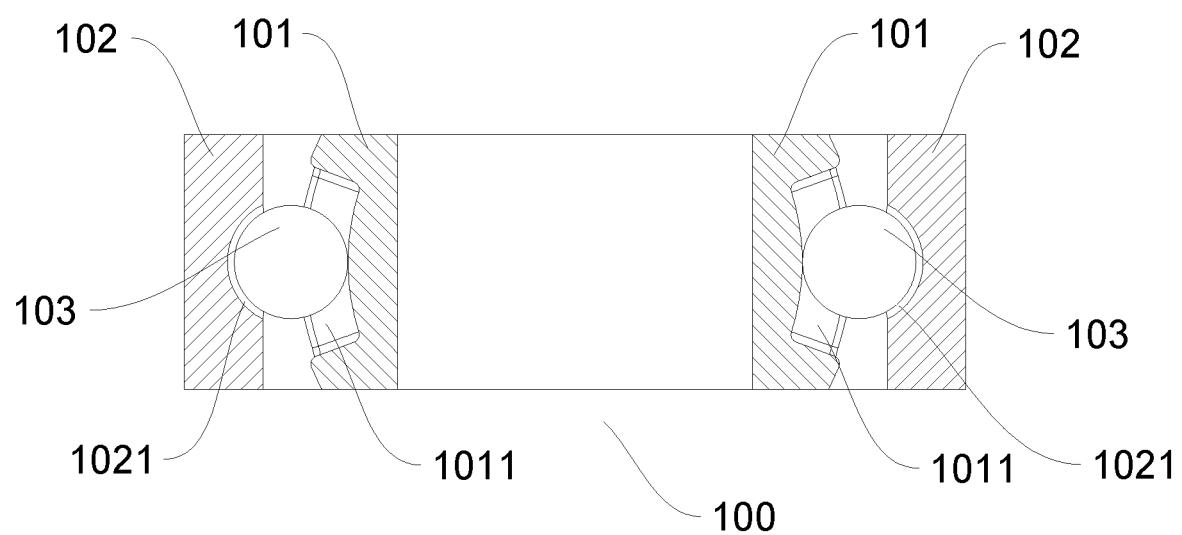
FIG. 3 is a cross-sectional view of a swing bearing according to a second embodiment of the present disclosure.

In a second implementation provided in the present disclosure, as shown in FIG. 3 and FIG. 6, a size L1 of the first groove 1011 in an axial direction of the inner ring 101 is greater than a size W1 of the first groove in a circumferential direction of the inner ring 101, the second groove 1021 is a spherical groove, one end of the ball 103 is adaptively accommodated in the first groove 1011 and can roll along a length direction of the first groove 1011, and the other end of the ball 103 is adaptively accommodated in the second groove 1021. In this implementation, one end of the ball 103 is in the second groove 1021 and cannot move circumferentially and axially relative to the outer ring 102, and the other end of the ball 103 cannot move circumferentially in the first groove 1011, but can roll along the length direction of the first groove 1011, so that the inner ring 101 and the outer ring 102 can rotate together, and the inner ring 101 can produce shaft axis deflection movement relative to the outer ring 102.

Further, a bottom surface of the first groove 1011 is a convex surface, that is, is convex in a direction close to the outer ring 102, so that a rolling track of the ball 103 along the length direction of the first groove 1011 is arc-shaped, thereby ensuring that swinging of the inner ring 101 relative to the outer ring 102 is shaft axis deflection movement.

Figure 4:
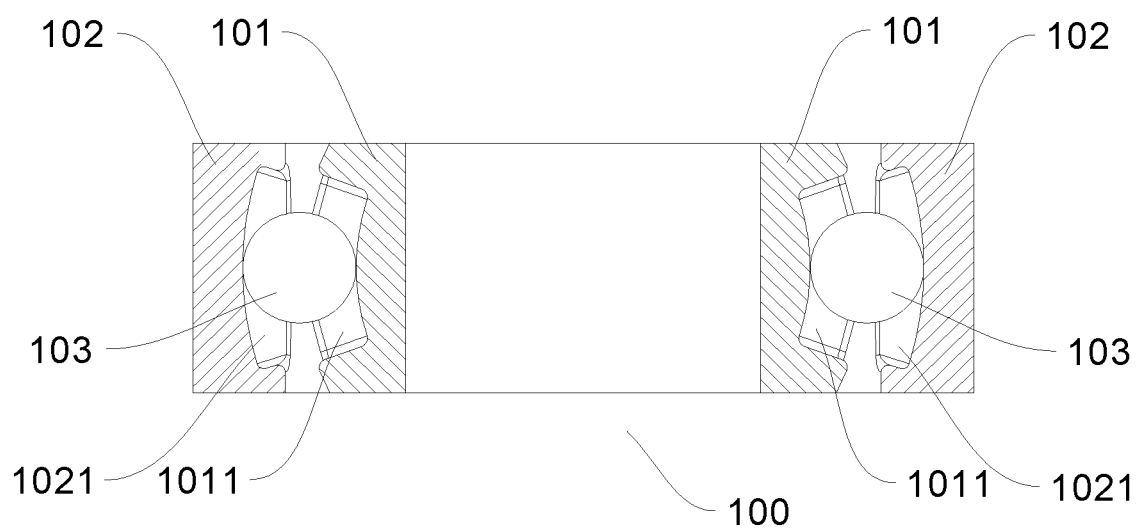
FIG. 4 is a cross-sectional view of a swing bearing according to a third embodiment of the present disclosure.

In a third implementation provided in the present disclosure, as shown in FIG. 4 and FIG. 6, a size L1 of the first groove 1011 in an axial direction of the inner ring 101 is greater than a size W1 of the first groove in a circumferential direction of the inner ring 101, a size L2 of the second groove 1021 in an axial direction of the outer ring 102 is greater than a size W2 of the second groove in a circumferential direction of the outer ring 102, one end of the ball 103 is adaptively accommodated in the first groove 1011 and can roll along a length direction of the first groove 1011, and the other end of the ball 103 is adaptively accommodated in the second groove 1021 and can roll along a length direction of the second groove 1021. In other words, two opposite side walls of the first groove 1011 and the second groove 1021 can jointly restrict circumferential movement of the ball 103, thereby restricting relative rotational movement of the outer ring 102 and the inner ring 101. In addition, the ball 103 can simultaneously roll along the length directions of the first groove 1011 and the second groove 1021 to increase a relative swing angle of the inner ring 101 and the outer ring 102.

Figure 5:
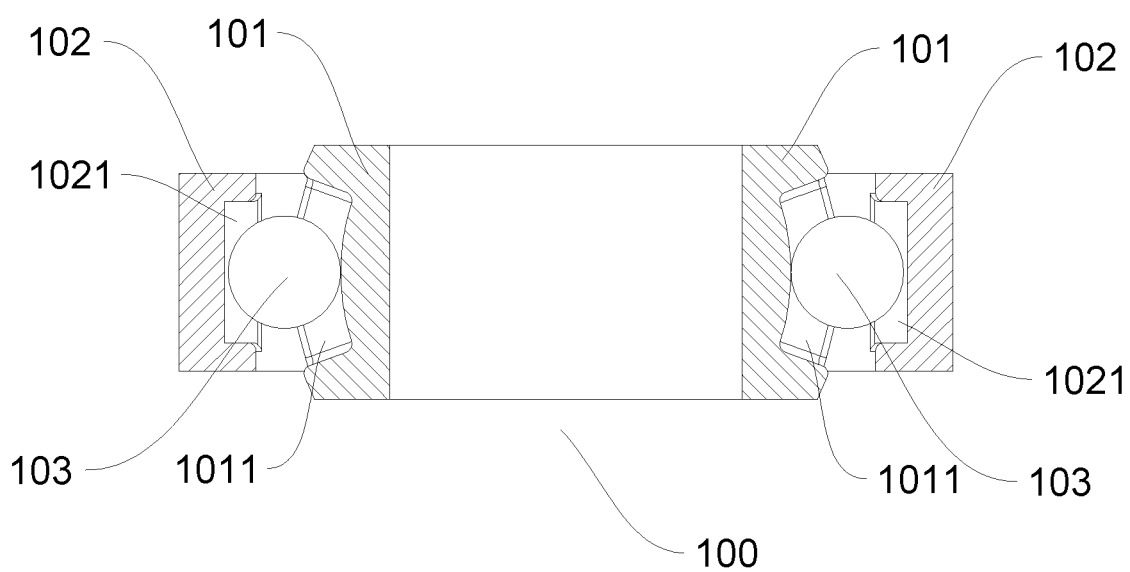
FIG. 5 is a cross-sectional view of a swing bearing according to a fourth embodiment of the present disclosure.

Further, a bottom surface of the first groove 1011 is a convex surface, that is, is convex in a direction close to the outer ring 102, a bottom surface of the second groove 1021 is a concave surface, that is, is recessed in a direction away from the inner ring 101, and the convex surface matches the concave surface, so that a rolling track of the ball 103 along the length directions of the first groove 1011 and the second groove 1021 is arc-shaped, thereby ensuring that swing produced by the inner ring 101 and the outer ring 102 is shaft axis deflection movement. In a fourth implementation provided in the present disclosure, as shown in FIG. 5, a bottom surface of the first groove 1011 is a convex surface, and a bottom surface of the second groove 1021 is a flat surface. A swing angle of the swing bearing 100 provided in this implementation is slightly less than a swing angle of the swing bearing 100 provided in the third implementation.

In order to facilitate relative swing of the inner ring 101 and the outer ring 102, and prevent mutual interference of the inner ring 101 and the outer ring 102 in a swing process from affecting a swing effect and a swing angle, an outer circumferential surface of the inner ring 101 is a convex surface, and the convex surface is convex in a direction close to the outer ring 102.

As shown in FIG. 7 to FIG. 14, according to another aspect of the present disclosure, a wearable device is provided, including a housing 1, and a power generation module 2 and a circuit board 3 disposed in the housing 1 for generating electric energy, where the circuit board 3 is provided with an energy collection module 4 configured to collect electric energy, a detection function module 5 configured to detect movement information, and a radio frequency module 6 configured to exchange data with a terminal device, the power generation module 2 providing electric energy for the detection function module 5 and the radio frequency module 6 through the energy collection module 4, the energy collection module 4 being connected to the power generation module 2, and the detection function module 5 being connected to the radio frequency module 6.

The power generation module 2 includes a substrate 200, a counter weight 300, a rotating shaft 400, a transmission mechanism 800, a permanent magnet 500, a soft magnet 600, a coil 700, and the above swing bearing 100, the rotating shaft 400 being rotatably mounted on the substrate 200. Specifically, the rotating shaft 400 is mounted on the substrate 200 through a ball bearing 201 so that the rotating shaft 400 can rotate relative to the substrate 200. The counter weight 300 is mounted on the rotating shaft 400 through the swing bearing 100, the inner ring 101 of the swing bearing 100 is fixed to the rotating shaft 400, the outer ring 102 of the swing bearing 100 is fixed to the counter weight 300, so that the counter weight 300 can drive the rotating shaft 400 to rotate through the swing bearing 100 under the action of gravity or inertial momentum. To ensure that the counter weight 300, the swing bearing 100, and the rotating shaft 400 do not rotate relative to each other, the rotating shaft 400 may be a flat shaft. The rotating shaft 400 is connected to the permanent magnet 500 through the transmission mechanism 800, and transmits power to the permanent magnet 500, thereby driving the permanent magnet 500 to rotate. The permanent magnet 500 is located in the soft magnet 600, the coil 700 is adjacent to the soft magnet 600, and an axial direction of the coil 700 is perpendicular to a rotation axis of the permanent magnet 500. The permanent magnet 500 magnetizes the soft magnet 600 in a rotation process, and a changing magnetic field is generated inside and around the soft magnet 600, so that an induced current is generated in the coil 700. The coil 700 is connected to the energy collection module 4, and transmits a current to the energy collection module 4 for storage.

Because the above swing bearing 100 is applied to the power generation module 2, the counter weight 300 can rotate under the action of gravity or inertia and swing within a specified angle range. When the counter weight 300 is in an inclined state, swing of the counter weight 300 can effectively increase a gravity component of a gravity of the counter weight 300 in a vertical direction or a component of an inertial momentum on a rotation plane of the counter weight so that more mechanical energy or kinetic energy can be collected and converted to improve energy conversion efficiency of the power generation module 2. As a result, mechanical energy and energy during daily exercise can become an auxiliary energy source or even an independent energy source of a wearable device, thereby effectively improving endurance of the wearable device.

Figure 7:
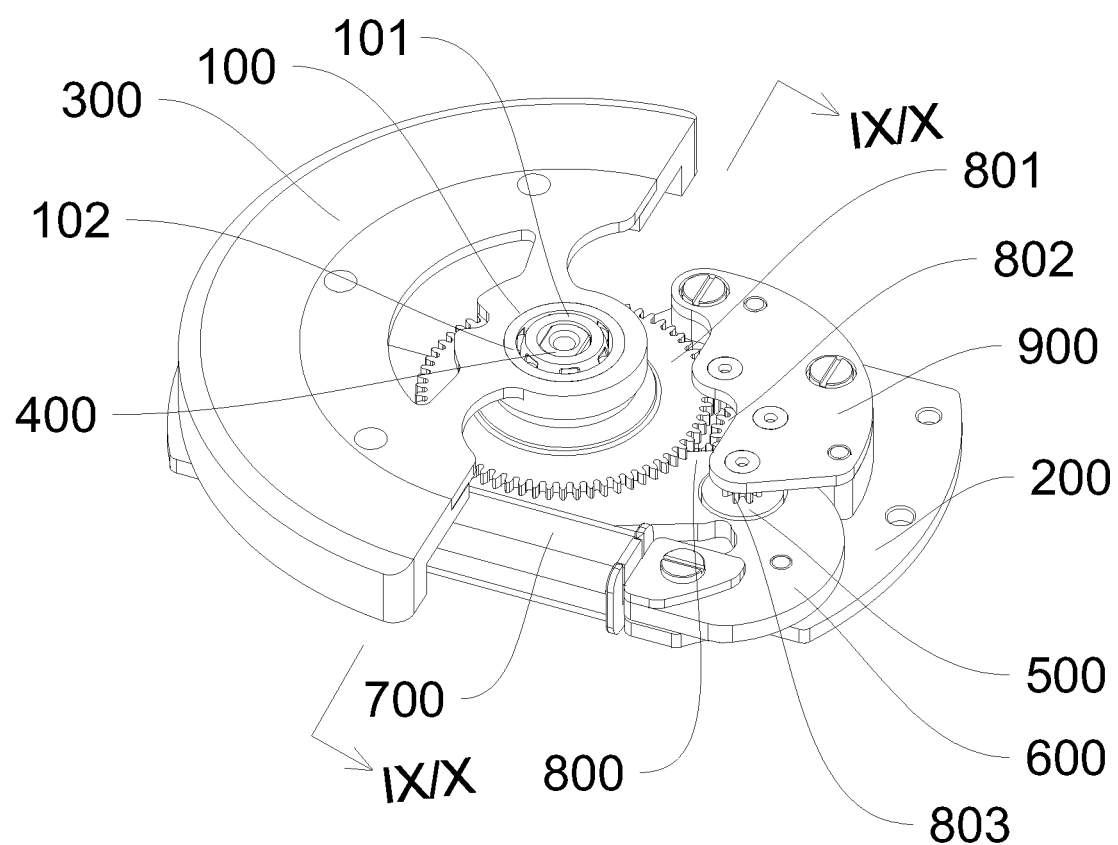
FIG. 7 is a schematic diagram of a three-dimensional structure of a power generation module according to an exemplary embodiment of the present disclosure.
Figure 8:
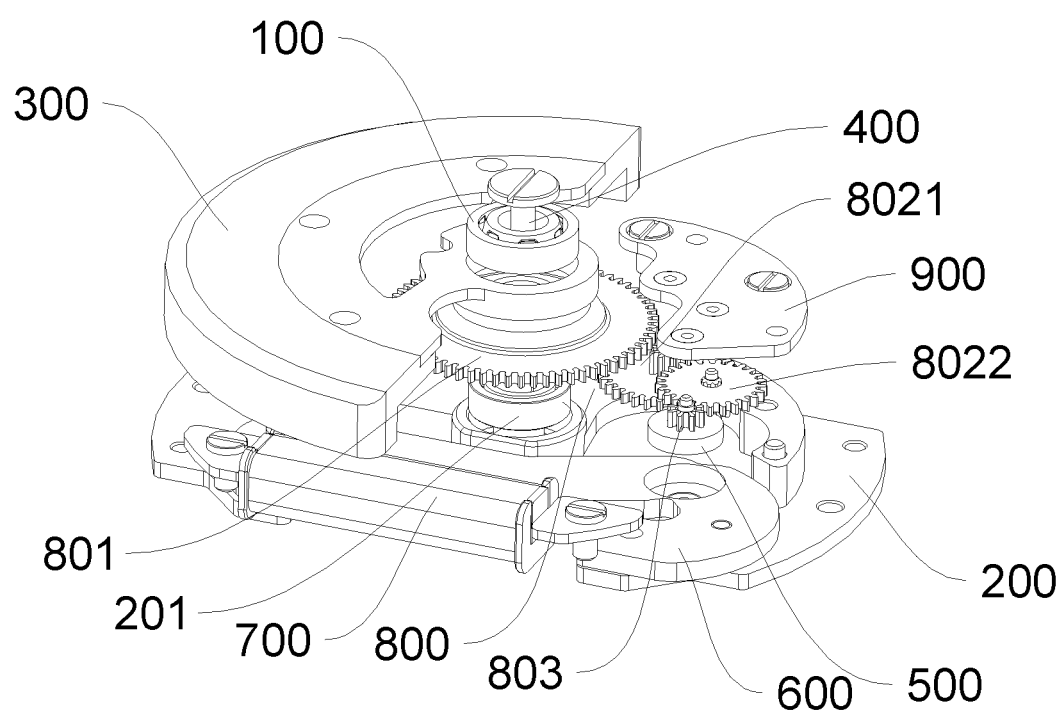
FIG. 8 is an exploded schematic diagram of a power generation module according to an exemplary embodiment of the present disclosure.
Figure 9:
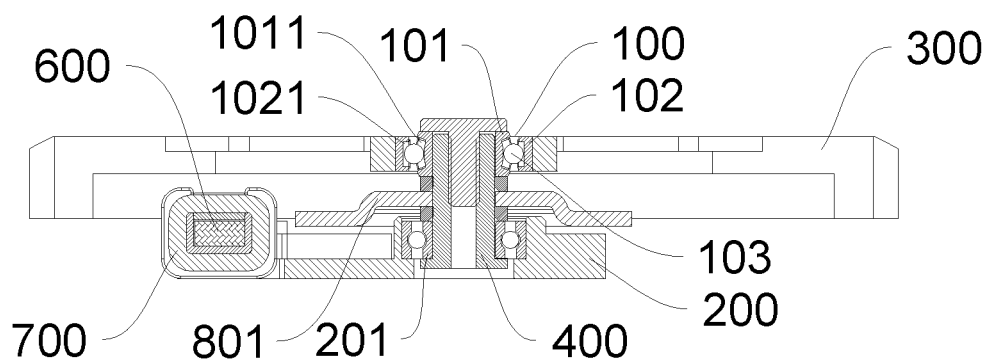
FIG. 9 is a cross-sectional view along an IX-IX direction of FIG. 7, where a counter weight is not in a swing state.
Figure 10:
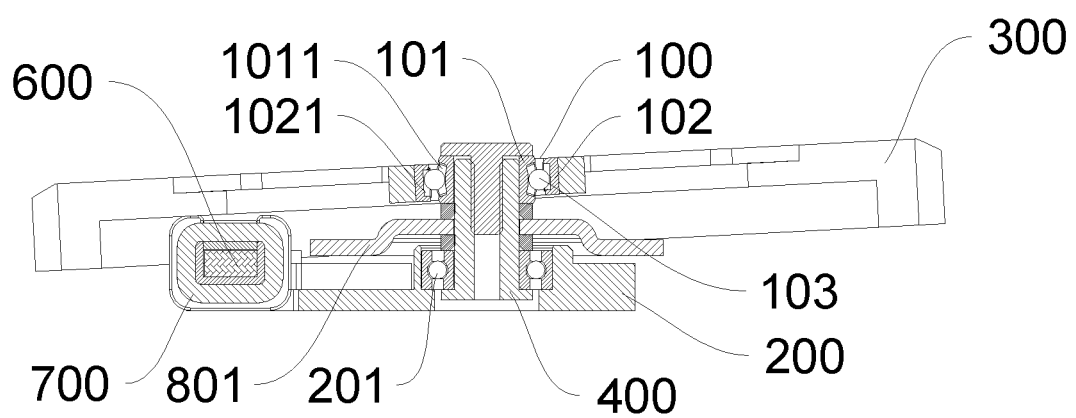
FIG. 10 is a cross-sectional view along an X-X direction of FIG. 7, where a counter weight is in a swing state.
Figure 11:
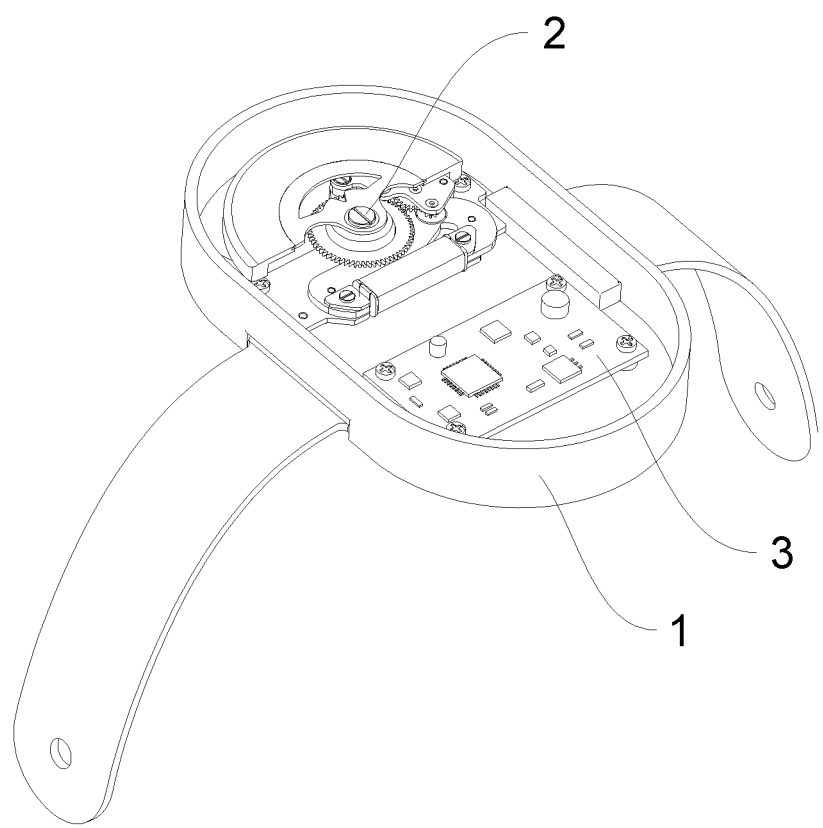
FIG. 11 is a perspective schematic diagram of a wearable device according to an exemplary embodiment of the present disclosure.
Figure 12:
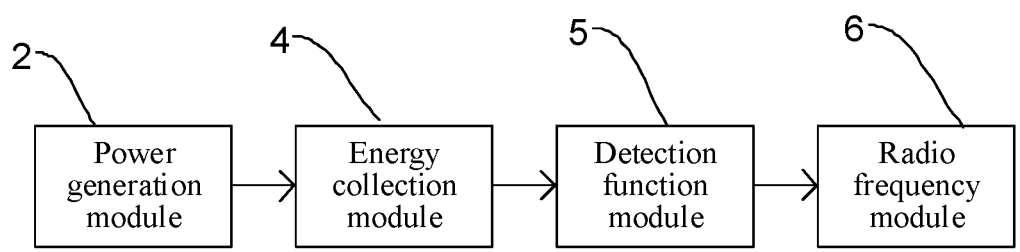
FIG. 12 is a block diagram of an apparatus structure of a wearable device according to an exemplary embodiment of the present disclosure.

Further, as shown in FIG. 7 and FIG. 8, the transmission mechanism 800 includes an input gear 801, a speed-up gear set 802, and an output gear 803, the speed-up gear set 802 being connected to the input gear 801 and the output gear 803, the input gear 801 being mounted on the rotating shaft 400, and the output gear 803 and the permanent magnet 500 being coaxially rotatably connected to each other. The counter weight 300 rotates under the action of gravity or inertial momentum, drives the input gear 801 to rotate through the rotating shaft 400, and transmits power to the permanent magnet 500 through a gear transmission principle between the input gear 801, the speed-up gear set 802, and the output gear 803, thereby driving the permanent magnet 500 to rotate. Cooperation between gears may be direct meshing of two gears, or cooperation between the two gears through other parts, so that one gear can drive the other gear to rotate. The speed-up gear set 802 is used to increase a rotation speed of the output gear 803, so that the rotation speed of the output gear 803 is greater than a rotation speed of the input gear 801, and high-speed rotation occurs, so that the permanent magnet 500 generates a high-frequency varying magnetic field in a plane on which the permanent magnet is located.

Specifically, in an exemplary implementation provided in the present disclosure, the speed-up gear set 802 includes a first speed-up gear set 8021 and a second speed-up gear set 8022. The first speed-up gear set 8021 includes a first gear and a second gear, the first gear and the second gear are coaxially rotatably connected to each other, and a quantity of teeth of the first gear is less than a quantity of teeth of the second gear. The second speed-up gear set 8022 includes a third gear and a fourth gear, the third gear and the fourth gear are coaxially rotatably connected to each other, a quantity of teeth of the third gear is less than a quantity of teeth of the fourth gear, and the quantity of teeth of the third gear is less than the quantity of teeth of the second gear. The first gear cooperates with the input gear 801, the second gear cooperates with the third gear, and the fourth gear cooperates with the output gear 803, so that the rotation speed of the output gear 803 is increased and the permanent magnet 500 rotates at a high speed. In other implementations, the speed-up gear set 802 may further include a third speed-up gear to further increase the rotation speed of the output gear 803.

In addition, as shown in FIG. 7 and FIG. 8, the power generation module 2 further includes a pressure plate 900 for preventing circumferential sliding and radial shaking of the input gear 801, the speed-up gear set 802, and the output gear 803, the pressure plate 900 being fixed on the base plate 200 parallel to the substrate 200, and the input gear 801, the speed-up gear set 802, and the output gear 803 being disposed between the substrate 200 and the pressure plate 900

As shown in FIG. 7 and FIG. 8, in an exemplary implementation provided in the present disclosure, the permanent magnet 500 is annular, and an N pole and an S pole of the permanent magnet 500 are perpendicular to the rotation axis of the permanent magnet. The soft magnet 600 is generally plate-shaped, the soft magnet 600 is fixed on the substrate 200, and the soft magnet 600 is formed with a receiving hole. The permanent magnet 500 is located in the receiving hole, and a plane on which the soft magnet 600 is located is perpendicular to the rotation axis of the permanent magnet 500. The coil 700 is cylindrical as a whole, including a cylindrical body and a wire harness (usually an enameled wire) wound around the cylindrical body. The axial direction of the coil 700 is an axial direction of the cylindrical body, and the axial direction of the coil 700 is perpendicular to the rotation axis of the permanent magnet 500. When the permanent magnet 500 rotates, the soft magnet 600 generates a changing magnetic field under the action of the magnetic field of the permanent magnet 500, so that a magnetic flux in the coil 700 changes, thereby generating electric energy in the coil 700. The electric energy may be collected and stored by the energy collection module 4.

Figure 13:
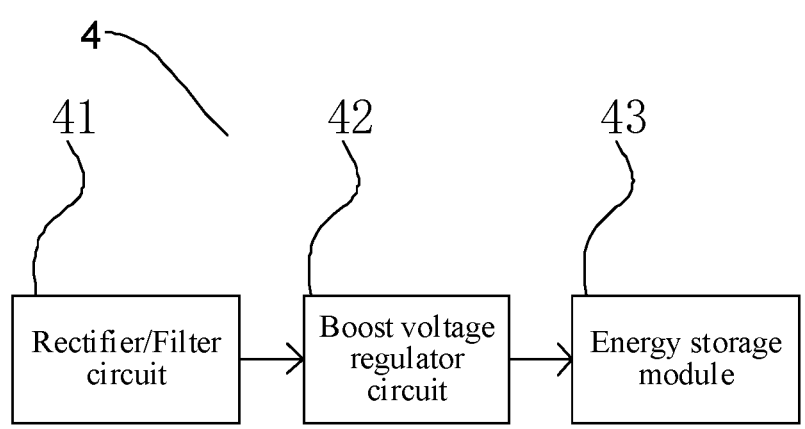
FIG. 13 is a block diagram of an apparatus structure of an energy collection module according to an exemplary embodiment of the present disclosure.

Further, as shown in FIG. 13, the energy collection module 4 includes a rectifier/filter circuit 41, a boost voltage regulator circuit 42, and an energy storage module 43 connected in sequence, the rectifier/filter circuit 41 being connected to the coil 700, and the energy storage module 43 being connected to the detection function module 5 to supply power to the detection function module 5. The rectifier/filter circuit 41 converts AC electric energy into DC electric energy, and the boost voltage regulator circuit 42 can increase and stabilize a voltage, and then charge the back-end energy storage module 43. The energy storage module 43 may be a super capacitor or a lithium battery.

Figure 14:
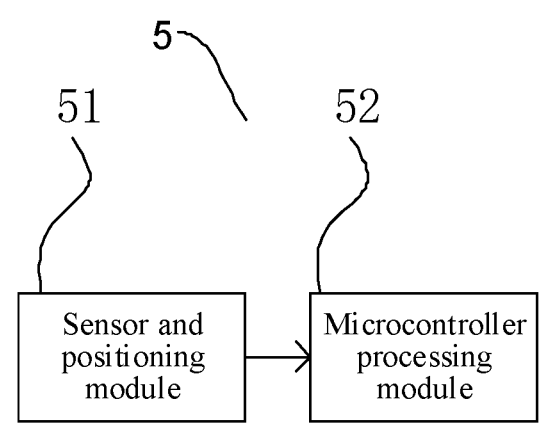
FIG. 14 is a block diagram of an apparatus structure of a detection function module according to an exemplary embodiment of the present disclosure.

Further, as shown in FIG. 14, the detection function module 5 includes a sensor and positioning module 51 and a microcontroller processing module 52 connected to each other, the sensor and positioning module 51 being connected to the energy collection module 4, and the microcontroller processing module 52 being connected to the radio frequency module 6. In the present disclosure, in an optional implementation, the sensor and positioning module 51 may use a nine-axis acceleration sensor for movement detection, then use a GPS module for positioning, and use a heart rate detection module to detect a heart rate of a wearable device wearer. The microcontroller processing unit may use a 32-bit microcontroller for logic operation and control. In addition, the radio frequency module 6 may be a Bluetooth module to exchange data with other Bluetooth terminal devices in a wireless manner.

The exemplary embodiments of the present disclosure are described in detail above with reference to the accompanying drawings, but the present disclosure is not limited to the specific details in the above embodiments. Various simple variations may be made to the technical solutions of the present disclosure within the scope of the technical idea of the present disclosure, and such simple variations shall all fall within the protection scope of the present disclosure.

It should be further noted that the specific technical features described in the above specific embodiments may be combined in any suitable manner without contradiction. To avoid unnecessary repetition, various possible combinations are not further described in the present disclosure.

In addition, the various embodiments of the present disclosure may be combined without departing from the idea of the present disclosure, and such combinations shall also fall within the scope of the present disclosure.

What is claimed is:

1. A power generation module, comprising:
   a counter weight;
   a rotating shaft; and
   a swing bearing, comprising: an inner ring, an outer ring, a plurality of rolling elements, a plurality of first grooves arranged at intervals along a circumferential direction being formed on an outer circumferential surface of the inner ring, and a plurality of second grooves arranged at intervals along a circumferential direction being formed on an inner circumferential surface of the outer ring, each rolling element being disposed between the corresponding first groove and the second groove, and the rolling element, the first groove, and the second groove being configured to restrict relative rotational movement between the inner ring and the outer ring and allow the inner ring and the outer ring to produce shaft axis deflection movement;
   wherein the counter weight is mounted on the rotating shaft through the swing bearing, the inner ring of the swing bearing is fixed to the rotating shaft, and the outer ring of the swing bearing is fixed to the counter weight.

2. The power generation module according to claim 1, wherein the rolling element is a ball.

3. The power generation module according to claim 2, wherein the first groove is a spherical groove, a size of the second groove in an axial direction of the outer ring is greater than a size of the second groove in a circumferential direction of the outer ring, one end of the ball is adaptively accommodated in the first groove, and the other end of the ball is adaptively accommodated in the second groove and can roll along a length direction of the second groove.

4. The power generation module according to claim 3, wherein a bottom surface of the second groove is a concave surface.

5. The power generation module according to claim 1, wherein a size of the first groove in an axial direction of the inner ring is greater than a size of the first groove in a circumferential direction of the inner ring, the second groove is a spherical groove, one end of the ball is adaptively accommodated in the first groove and can roll along a length direction of the first groove, and the other end of the ball is adaptively accommodated in the second groove.

6. The power generation module according to claim 5, wherein a bottom surface of the first groove is a convex surface.

7. The power generation module according to claim 1, wherein a size of the first groove in an axial direction of the inner ring is greater than a size of the first groove in a circumferential direction of the inner ring, a size of the second groove in an axial direction of the outer ring is greater than a size of the second groove in a circumferential direction of the outer ring, one end of the ball is adaptively accommodated in the first groove and can roll along a length direction of the first groove, and the other end of the ball is adaptively accommodated in the second groove and can roll along a length direction of the second groove.

8. The power generation module according to claim 7, wherein a bottom surface of the first groove is a convex surface, and a bottom surface of the second groove is a concave surface.

9. The power generation module according to claim 1, wherein the outer circumferential surface of the inner ring is a convex surface.

10. A wearable device, comprising: a housing, and the power generation module according to claim 1, and a circuit board disposed in the housing for generating electric energy, wherein the circuit board is provided with an energy collection module configured to collect electric energy, a detection function module configured to detect movement information, and a radio frequency module configured to exchange data with a terminal device, the power generation module providing electric energy for the detection function module and the radio frequency module through the energy collection module, the energy collection module being connected to the power generation module, and the detection function module being connected to the radio frequency module; and
    wherein the power generation module further comprises a substrate, a transmission mechanism, a permanent magnet, a soft magnet, and a coil, the rotating shaft being rotatably mounted on the substrate, the rotating shaft being connected to the permanent magnet through the transmission mechanism and driving the permanent magnet to rotate, the permanent magnet being located in the soft magnet, the coil being adjacent to the soft magnet, an axial direction of the coil being perpendicular to a rotation of axis of the permanent magnet, and the coil being connected to the energy collection module.

11. The wearable device according to claim 10, wherein the transmission mechanism comprises an input gear, a speed-up gear set, and an output gear, the speed-up gear set being connected to the input gear and the output gear, the input gear being mounted on the rotating shaft, and the output gear and the permanent magnet being coaxially rotatably connected to each other.

12. The wearable device according to claim 10, wherein a plane on which the soft magnet is located is perpendicular to the rotation axis of the permanent magnet.

13. The wearable device according to claim 10, wherein the energy collection module comprises a rectifier/filter circuit, a boost voltage regulator circuit, and an energy storage module connected in sequence, the rectifier/filter circuit being connected to the coil, and the energy storage module being connected to the detection function module.

14. The wearable device according to claim 10, wherein the detection function module comprises a sensor and positioning module and a microcontroller processing module connected to each other, the sensor and positioning module being connected to the energy collection module, and the microcontroller processing module being connected to the radio frequency module.

* * * * *